(12) United States Patent
Kim et al.

(10) Patent No.: US 8,628,884 B2
(45) Date of Patent: Jan. 14, 2014

(54) ANODE ACTIVE MATERIAL, METHOD OF PREPARING THE SAME, AND ANODE AND LITHIUM BATTERY CONTAINING THE MATERIAL

(75) Inventors: Gue-sung Kim, Yongin-si (KR); Jin-hwan Park, Seoul (KR); Yongnam Ham, Ansan-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/818,974

(22) Filed: Jun. 18, 2010

(65) Prior Publication Data

US 2010/0258761 A1 Oct. 14, 2010

Related U.S. Application Data

(62) Division of application No. 11/582,050, filed on Oct. 16, 2006, now Pat. No. 7,767,346.

(30) Foreign Application Priority Data

Oct. 17, 2005 (KR) ........................ 10-2005-0097514

(51) Int. Cl.
*H01M 4/62* (2006.01)
*H01M 4/58* (2010.01)
*H01M 4/88* (2006.01)

(52) U.S. Cl.
USPC .................. 429/232; 429/231.95; 252/182.1

(58) Field of Classification Search
None
See application file for complete search history.

(56) References Cited

U.S. PATENT DOCUMENTS

| 3,664,888 | A | * | 5/1972 | Oga et al. ....................... 148/272 |
| 5,304,330 | A | * | 4/1994 | Tatarchuk et al. ................ 419/2 |
| 5,919,589 | A | * | 7/1999 | Kawakami et al. ........ 429/231.8 |
| 6,679,926 | B1 | * | 1/2004 | Kajiura et al. ............... 29/623.1 |
| 2005/0233213 | A1 | | 10/2005 | Lee et al. |

(Continued)

FOREIGN PATENT DOCUMENTS

| CN | 101061593 A | 10/2007 |
| CN | 101099251 A | 1/2008 |

(Continued)

OTHER PUBLICATIONS

Abstract for Japanese Publication No. 2001-196065, dated Jul. 19, 2001; in the name of Ujiie Yasuharu.

(Continued)

*Primary Examiner* — Barbara Gilliam
*Assistant Examiner* — Angela Martin
(74) *Attorney, Agent, or Firm* — Christie, Parker & Hale, LLP

(57) ABSTRACT

An anode active material comprises metal core particles, metal nano wires formed on the metal core particles, pores between the metal core particles and the metal nano wires, and a carbon-based coating layer formed on a surface of the metal core particles and metal nano wires. In the anode active material according to the present invention, the metal core particles and metal nano wires are combined to form a single body, and a carbon-based coating layer is formed on the surface of the metal nano wires and metal core particles. Thus, volume changes in the pulverized metal core particles can be effectively buffered during charging and discharging, and the metal core particles are electrically connected through the metal nano wires. As a result, volume changes in the anode active material and degradation of the electrode can be prevented, thereby providing excellent initial charge/discharge efficiency and enhanced charge/discharge capacity.

10 Claims, 3 Drawing Sheets

(56) References Cited

U.S. PATENT DOCUMENTS

| | | |
|---|---|---|
| 2006/0002844 A1 | 1/2006 | Suenaga et al. |
| 2006/0216606 A1* | 9/2006 | Kim et al. ............... 429/232 |
| 2007/0003749 A1 | 1/2007 | Asgari |
| 2007/0048521 A1* | 3/2007 | Istvan .................... 428/367 |
| 2009/0004094 A1 | 1/2009 | Smalley et al. |
| 2009/0004566 A1 | 1/2009 | Shirane et al. |
| 2009/0123840 A1 | 5/2009 | Shirane et al. |
| 2009/0142522 A1 | 6/2009 | Alivisatos et al. |
| 2009/0169951 A1* | 7/2009 | Suenaga et al. ............ 429/30 |

FOREIGN PATENT DOCUMENTS

| | | | |
|---|---|---|---|
| JP | 2001-250542 | * 9/2001 | ............ H01M 4/38 |
| JP | 2002-216751 | 8/2002 | |
| KR | 10-2004-0063802 | 7/2004 | |
| KR | 10-2005-0090218 | 9/2005 | |
| KR | 10-2006-0087383 | 8/2006 | |
| KR | 10-0698372 B1 | 3/2007 | |

OTHER PUBLICATIONS

Abstract for Japanese Publication No. 2004-158205, dated Nov. 1, 2002; in the name of Sasaki Jo.

Abstract for Korean Publication No. 2001-0105622, dated Nov. 29, 2001; in the name of Jae-Yul Ryu, et al.

SIPO Certificate of Patent dated Apr. 20, 2011, for corresponding Chinese Patent application 200610135949.8, 12 pages.

KIPO Registration Determination Certificate dated Aug. 31, 2007, for Korean priority Patent application 10-2005-0097514, 4 pages.

* cited by examiner

ANODE ACTIVE MATERIAL, METHOD OF PREPARING THE SAME, AND ANODE AND LITHIUM BATTERY CONTAINING THE MATERIAL

CROSS-REFERENCE TO RELATED PATENT APPLICATION

This application is a divisional application of U.S. patent application Ser. No. 11/582,050, filed Oct. 16, 2006, which claims priority to and the benefit of Korean Patent Application No. 10-2005-0097514, filed on Oct. 17, 2005 in the Korean Intellectual Property Office, the entire contents of both of which are incorporated herein by reference.

BACKGROUND OF THE INVENTION

1. Field of the Invention

The present invention relates to anode active materials, methods of preparing the same, and anode and lithium batteries containing the anode active materials. More particularly, the invention is directed to an anode active material having pores for buffering volume changes during charging and discharging. The invention is also directed to a lithium battery having a long cycle life, which lithium battery employs the anode active material.

2. Description of the Related Art

Non-aqueous electrolyte secondary batteries, which include anodes comprising lithium compounds, exhibit high voltage and high energy density, and have therefore been widely researched. Lithium metal has been studied as an anode material because of its high capacity. However, when metallic lithium is used as an anode material, lithium dendrites are deposited onto the surface of the metallic lithium during charging. The lithium dendrites reduce the charge/discharge efficiency of the battery, and can cause short-circuits. Also, the risk of explosion and high sensitivity to heat and shock caused by the instability and high reactivity of metallic lithium has prevented the commercialization of metallic lithium anode batteries.

Carbon-based anodes have been used to address the problems of lithium anodes described above. Lithium ions present in an electrolyte are intercalated and deintercalated between crystal facets of the carbon-based anode, resulting in the occurrence of oxidation and reduction reactions. A battery including a carbon-based anode is referred to as a rocking chair battery.

Carbon-based anodes have addressed various problems caused by lithium metal, and have become popular. However, there is a need for lithium secondary batteries with high capacity in order to allow for minimization, reductions in weight and increases in power of portable electronic devices. Lithium batteries containing carbon-based anodes have low capacity due to the porous structure of carbon. For example, even for graphite (which is the carbon structure with the highest crystallinity) the theoretical capacity of a $LiC_6$ composition is about 372 mAh/g. This is less than 10% of the theoretical capacity of lithium metal, which is about 3860 mAh/g. Therefore, despite the existing problems with metallic lithium, much research has been actively performed to improve the capacity of batteries by introducing metals such as lithium into the anodes.

It is known that Li and alloys such as Li—Al, Li—Pb, Li—Sn and Li—Si provide higher electrical capacities than carbon-based materials. However, when such alloys or metals are used by themselves, the deposition of lithium dendrites occurs. Therefore, use of a suitable mixture of such alloys or metals and carbon-based materials has been researched to provide high electrical capacity while also avoiding problems such as short circuits.

However, in such a mixture of metal materials and carbon-based materials, the volume expansion coefficient during oxidation and reduction of the carbon-based materials is different from that of the metal materials, and the metal materials can react with the electrolyte. When charging the anode material, lithium ions are introduced into the anode material. When this happens, the anode expands and also becomes more dense. On discharging, the lithium ions leave the anode, and the volume of the anode decreases. At this time, if the anode contracts, there remain voids in the anode that are not electrically connected due to the difference between the expansion coefficients of the carbon-based materials and the metal materials. Due to the electrically insulated voids, the movement of electrons is not effective and the efficiency of the battery is decreased. Also, a reaction between the metal materials and the electrolyte during the charging and discharging can decrease the lifetime of the electrolyte, thereby decreasing the lifetime and efficiency of the battery.

To overcome these problems, electrodes have been prepared by adding polymer additives for providing elasticity and pores to the active material. The polymer additive is simply mixed with the active material in the process of manufacturing the electrode, and provides elasticity and pores to the active material to enhance the cycle properties of the battery. However, since the additive is not adhered to the active material, electrical insulation may occur when the elasticity of the additive decreases due to long-term use.

An active material including two types of graphite having different surface densities has also been prepared. The energy density of the active material is increased by reducing pores between active material particles by mixing ball-shaped particles and needle-shaped particles. Additionally, an anode active material having spherical graphite and plate graphite has been prepared. An electrolyte can easily impregnate such an anode active material, and thus, the electrical capacity of the battery can be increased. However, only active materials, such as graphite, that do not show large volume changes during charging and discharging are suitable for such anode active materials. Thus active materials that show large volume changes during charging and discharging are not suitable.

Accordingly, a need exists for a more practical anode active material having excellent charge and discharge properties, a long lifetime and high efficiency.

SUMMARY OF THE INVENTION

In one embodiment, the present invention provides an anode active material having a novel structure.

In another embodiment, the present invention provides an anode electrode employing the anode active material.

In yet another embodiment, the present invention provides a lithium battery having excellent initial charge/discharge efficiency and enhanced charge/discharge capacity by employing the anode electrode In still another embodiment, the present invention provides a method of preparing the anode active material.

According to one embodiment of the present invention, an anode active material includes metal core particles, metal nano wires formed on the metal core particles as a single body, pores between the metal core particles and the metal nano wires, and a carbon-based coating layer formed on a surface of the metal core particles and the metal nano wires.

In one embodiment, the metal nano wires and the metal core particles in the anode active material may include a metal that can be alloyed with lithium. Nonlimiting examples of suitable materials for the metal nano wires and the metal core particles include Si, Sn, Al, Ge, Pb, Bi, Sb, alloys thereof, and combinations thereof.

In one embodiment, the carbon-based coating layer may be a sintered product of a polymer material. Nonlimiting examples of suitable polymer materials include resins such as vinyl resins, phenol resins, cellulose resins, pitch resins, tar resins, and combinations thereof.

In another embodiment, the anode active material may further include a carbon-based active material. The carbon-based active material may be a fibrous carbon-based active material.

According to another embodiment of the present invention, an anode electrode includes the anode active material.

According to yet another embodiment of the present invention, a lithium battery employs the anode electrode.

According to still another embodiment of the present invention, a method of preparing an anode active material includes preparing a mixture by mixing a metal particle powder, a polymer material and a pore-forming material, pulverizing the mixture, and sintering the pulverized mixture. The metal particle powder may include a metal that can be alloyed with lithium. Nonlimiting examples of suitable materials for the metal particle powder include Si, Sn, Al, Ge, Pb, Bi, Sb, alloys thereof, and combinations thereof.

Nonlimiting examples of suitable polymer materials include resins such as vinyl resins, phenol resins, cellulose resins, pitch resins, tar resins, and combinations thereof.

Nonlimiting examples of suitable pore-forming materials include oxalic acid, citric acid, malic acid, glycine, ammonium carbonate, ammonium bicarbonate, ammonium oxalate, and combinations thereof.

In one embodiment, pulverizing the mixture may be performed by high energy milling, mechano fusion, or using a hammer mill.

In one embodiment, sintering the pulverized mixture may be performed at a temperature ranging from about 500 to about 1,400° C.

In one embodiment, the weight ratio of metal particle powder to polymer material for preparing the mixture ranges from about 1:50 to about 10:1.

In one embodiment, the metal particle powder may be silicon, the polymer material may be a polyvinyl alcohol, the pore-forming material may be oxalic acid, the pulverizing may be performed by high energy milling, and the sintering temperature may range from about 700 to about 1,000° C.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

Figure 1:
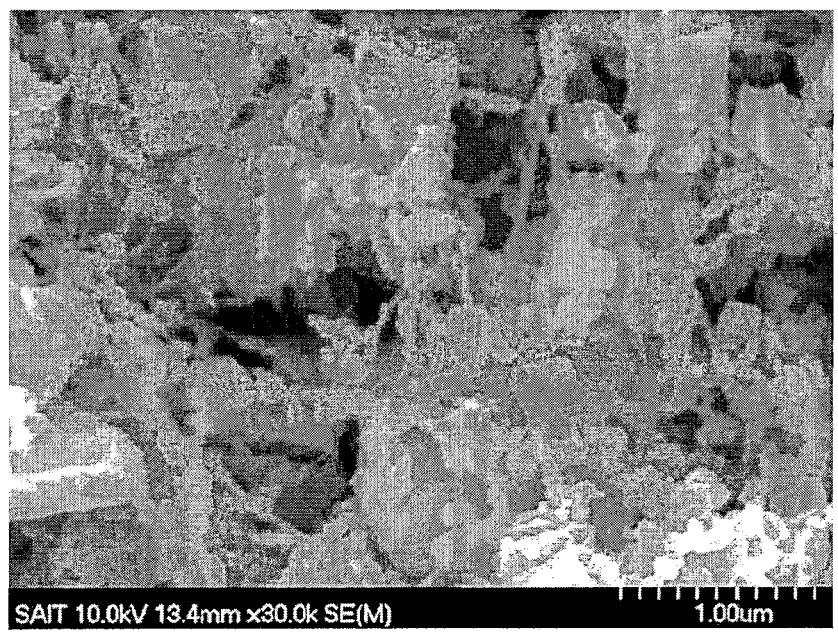
FIG. 1 is a scanning electron microscope (SEM) image of an anode active material prepared according to Example 3.

The present invention will now be described with reference to the accompanying drawings, in which exemplary embodiments of the invention are shown. The invention may, however, be embodied in many different forms and should not be construed as limited to the embodiments set forth herein. Rather, the described embodiments are provided for illustrative purposes only.

In a conventional anode active material, only a carbon layer coated on the surface of metal core particles buffers volume changes that occur during charging and discharging. Such a technique does not adequately prevent battery degradation. In an anode active material having pores according to an embodiment of the present invention, the metal core particles and metal nano wires formed on the metal core particles are combined in a single body, and a carbon-based coating layer is formed on the surface of the metal nano wires and the metal core particles. Thus, volume changes in the pulverized metal core particles during charging and discharging can be effectively buffered and the metal core particles are electrically connected through the metal nano wires. As a result, volume changes in the anode active material can be prevented and degradation of the electrode can be prevented, thus providing improved initial charge/discharge efficiency and enhanced charge/discharge capacity.

As used herein, the term "metal nano wire" includes wire-shaped metal with a nano-sized diameter having a large aspect ratio, regardless of its manufacturing process. Accordingly, the metal nano wires may include nanorods, nanotubes, and the like.

An anode active material according to one embodiment of the present invention includes metal core particles; metal nano wires formed on the metal core particles, wherein the metal core particles and the metal nano wires form a single body; pores between the metal core particles and the metal nano wires; and a carbon-based coating layer formed on the surface of the metal core particles and the metal nano wires.

Metallic active materials conventionally used as anode active materials have high capacity, but the charge/discharge properties of the batteries are degraded due to large volume changes during charging and discharging. Particularly, when a carbon layer is coated on the surface of the metal, the repeated charging and discharging disrupts the carbon coating layer, resulting in electrical insulation, and preventing reversible lithium ion charging and discharging. However, the anode active material according to one embodiment of the present invention is prepared by pulverizing the mixture of a polymer material, a pore-forming material, and a metal active material by high energy milling, and sintering the pulverized mixture. According to this embodiment, a newly exposed crystal surface (for example a (111) crystal surface) of the pulverized metal active material (i.e. metal core particles) acts as a growth point of the nano wires. The metal nano wires connect the metal active materials while growing, and the carbon-based coating layer (in which a polymer material is carbonized) is formed on at least a portion of the surface (or on the entire surface) of the metal nano wires and the metal core particles. The pore-forming material is vaporized during sintering to produce pores, and thus the anode active material has a porous structure.

Figure 2:
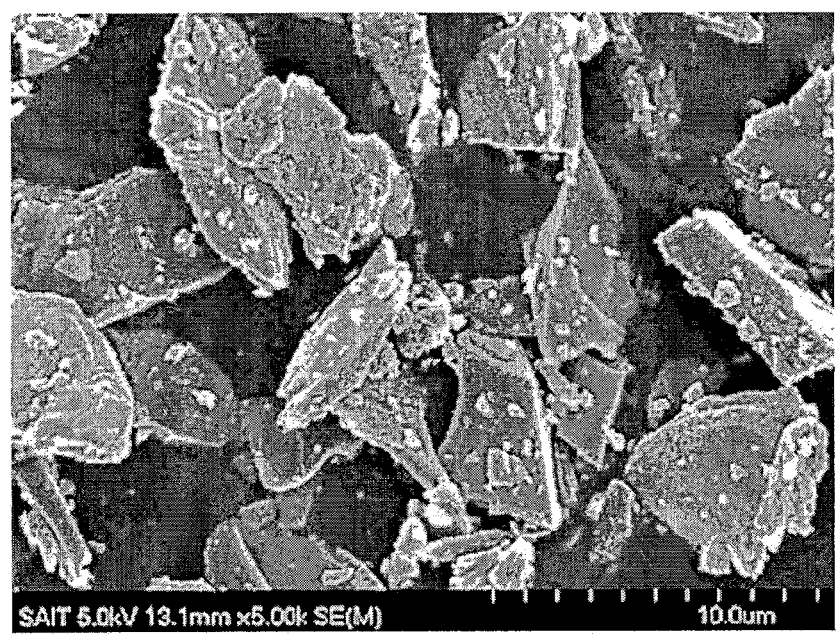
FIG. 2 is an SEM image of an anode active material prepared according to Comparative Example 6.

FIG. 1 is a scanning electron microscope (SEM) image of an anode active material according to one embodiment of the present invention. Referring to FIG. 1, the metal core particles and the metal nano wires are irregularly and three-dimensionally arranged. Empty spaces exist between the metal nano wires. The metal core particles formed on the surface of the metal nano wires have various and irregular shapes, and may be spherical, polygonal, or the like. Such various and irregular shapes may be generated by breaking and deforming the metal core particles during the pulverizing and sintering processes. In contrast, in conventional anode active materials, such as those illustrated in FIG. 2, metal active materials are simply distributed and are not electrically connected due to the absence of metal nano wires.

In one embodiment, the metal nano wires and metal core particles may include metals that can be alloyed with lithium. Nonlimiting examples of suitable metals for use as the metal nano wires and the metal core particles include Si, Sn, Al, Ge, Pb, Bi, Sb, alloys thereof, and combinations thereof. However, it is understood that any metal commonly used in lithium batteries can be used in the inventive anode active materials.

In one embodiment, the carbon-based coating layer in the anode active material may be a sintered polymer material. Nonlimiting examples of suitable polymer materials include resins such as vinyl resins, phenol resins, cellulose resins, pitch resins, tar resins and combinations thereof. However, it is understood that any polymer that can be sintered to a carbon-based material by heating can be used as the polymer material.

In one embodiment, a fibrous carbon-based active material can be included in the anode active material. When such a fibrous carbon-based active material is used, more pores can be generated in the anode active material, thereby more effectively buffering volume changes in the metal core particles.

In another embodiment, a carbon-based active material may be further included in the anode active material. The amounts of metal and carbon in the metal-carbon active material are not limited, and can be regulated as desired.

An anode according to one embodiment of the present invention includes an anode active material according to one of the embodiments described above. For example, the anode may be manufactured by mixing an anode active material and a binder to form an anode material composition and shaping the composition. The anode may also be manufactured by coating the anode material composition on a current collector such as a copper foil.

In more detail, an anode material composition is first prepared. The anode material composition may be directly coated on a current collector such as copper foil to prepare an anode plate. Alternatively, the anode material composition may be cast on a separate support to form an anode active material film. The anode active material film is then removed from the support and laminated on a current collector such as copper foil to prepare an anode plate. However, it is understood that the method of manufacturing the anode is not limited to the above-described embodiments.

Batteries require high current for charging and discharging to ensure high capacity. For this, battery electrodes must have low electrical resistance. To reduce the resistance of an electrode, various conducting agents are generally added. Carbon black, graphite microparticles, etc. are some nonlimiting examples of suitable such conducting agents.

Figure 4:
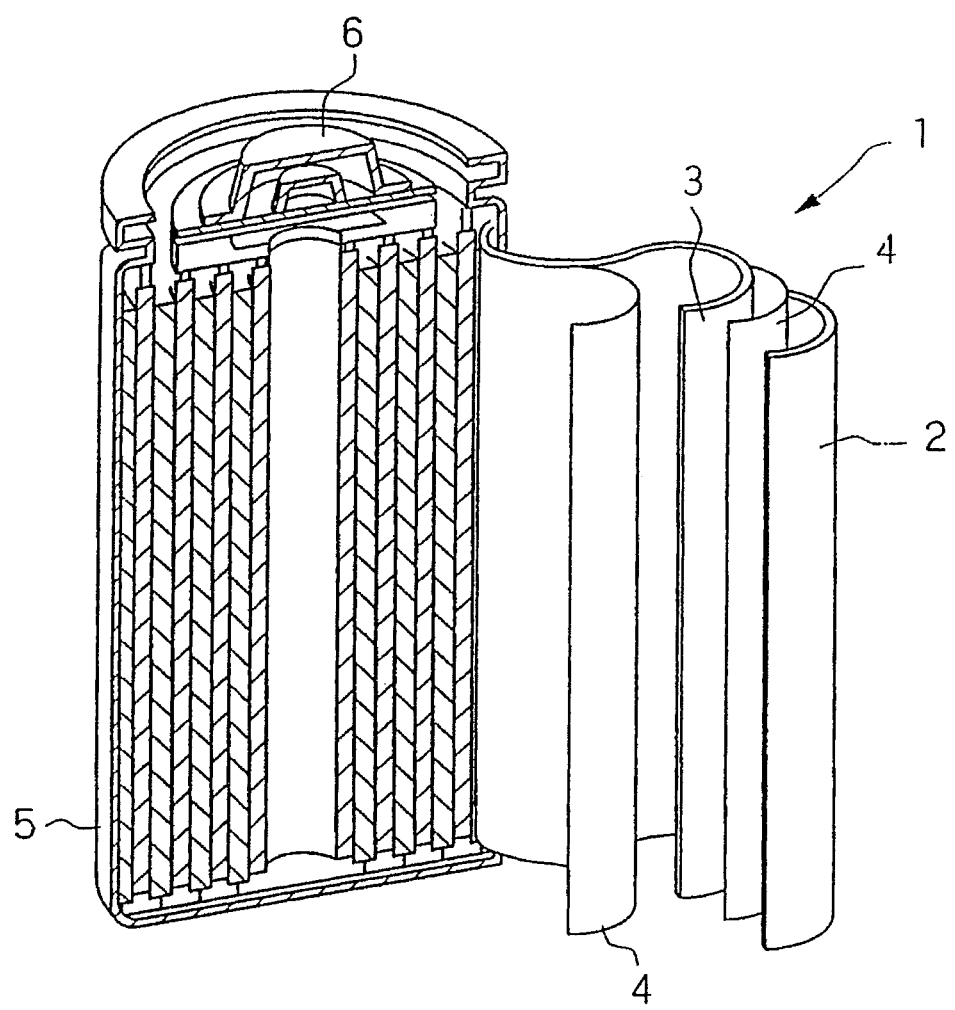
FIG. 4 is a schematic perspective view of a lithium battery according to one embodiment of the present invention.

A lithium battery according to one embodiment of the present invention includes an anode as described above. As shown in FIG. 4, the lithium battery 1 according to an embodiment of the present invention includes an electrode assembly comprising an anode 2 as described above, a cathode 3 and a separator 4 positioned between the anode 2 and the cathode 3. The electrode assembly is contained within a battery case 5 and sealed with a cap assembly 6. A lithium battery according to one embodiment of the present invention can be manufactured as follows.

First, a cathode active material, a conducting agent, a binder, and a solvent are mixed to prepare a cathode active material composition. The cathode active material composition is coated directly on a metal current collector and dried to prepare a cathode plate. Alternatively, the cathode active material composition is cast on a separate support to form a film which is then separated from the support and laminated on a metal current collector to prepare a cathode plate.

The cathode active material may be any lithium-containing metal oxide commonly known in the art. Nonlimiting examples of suitable such cathode active materials include $LiCoO_2$, $LiMn_xO_{2x}$, $LiNi_{x-1}Mn_xO_{2x}(x=1, 2)$, $Ni_{1-x-y}Co_xMn_yO_2(0 \leq x \leq 0.5, 0 \leq y \leq 0.5)$, etc. In one embodiment, a compound capable of inducing the oxidation and reduction of lithium, such as $LiMn_2O_4$, $LiCoO_2$, $LiNiO_2$, $LiFeO_2$, $V_2O_5$, TiS or MoS, may be used as the cathode active material.

One nonlimiting example of a suitable conducting agent is carbon black. Nonlimiting examples of suitable binders for use in the cathode active material include vinylidenefluoride/hexafluoropropylene copolymers, polyvinylidenefluoride, polyacrylonitrile, polymethylmethacrylate, polytetrafluoroethylene and mixtures thereof. Other nonlimiting examples of suitable binders include styrene butadiene rubber polymers. Nonlimiting examples of suitable solvents include N-methylpyrrolidone, acetone, water, etc. The amounts of the cathode active material, the conducting agent, the binder, and the solvent are the same as those commonly used in lithium batteries.

Any separator commonly known in the lithium battery field may be used. In one embodiment, the separator may have low resistance to the transfer of ions from an electrolyte and may allow the impregnation of the electrolyte. Nonlimiting examples of suitable materials for the separator include nonwoven fabrics, woven fabrics, glass fiber, polyester, Teflon, polyethylene, polypropylene, polytetrafluoroethylene (PTFE), and combinations thereof. In more detail, in a lithium ion battery, a windable separator made of a material such as polyethylene or polypropylene may be used. In a lithium ion polymer battery, a separator that allows the impregnation of an organic electrolyte solution may be used.

To manufacture the separator, a polymer resin, a filler, and a solvent are mixed to prepare a separator composition. Then, the separator composition is coated directly on an electrode and dried to form a separator film. Alternatively, the separator composition is cast on a separate support and dried to form a film. The film is then separated from the separator and laminated on an electrode.

The polymer resin is not particularly limited, and may be any material that can be used as a binder for an electrode plate. Nonlimiting examples of suitable polymer resins include vinylidenefluoride/hexafluoropropylene copolymers, polyvinylidenefluoride, polyacrylonitrile, polymethylmethacrylate, and mixtures thereof.

Nonlimiting examples of suitable solvents for use in the electrolytic solution include propylene carbonate, ethylene carbonate, diethyl carbonate, ethyl methyl carbonate, methyl propyl carbonate, butylene carbonate, benzonitrile, acetonitrile, tetrahydrofuran, 2-methyl tetrahydrofuran, y-butyrolactone, dioxolane, 4-methyl dioxolane, N,N-dimethylformamide, dimethyl acetamide, dimethylsulfoxide, dioxane, 1,2-dimethoxyethane, sulfolane, dichloroethane, chlorobenzene, nitrobenzene, dimethylcarbonate, methylethylcarbonate, diethylcarbonate, methylpropylcarbonate, methylisopropylcarbonate, ethylpropylcarbonate, dipropylcarbonate, dibutylcarbonate, diethyleneglycol, dimethyl ether, etc., and mixtures thereof.

Nonlimiting examples of suitable electrolytes include lithium salts such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$(wherein, x and y are natural numbers), LiCl, LiI, etc., and mixtures thereof.

A separator is positioned between the cathode plate and the anode plate to form a battery structure. The battery structure is wound or folded and encased in a cylindrical or square battery case, and an organic electrolyte solution is then injected into the cylindrical or square battery case to complete a lithium ion battery.

The battery structure may also be laminated to form a bi-cell structure and impregnated with an organic electrolyte solution. The resultant structure is encased in a pouch and sealed to thereby complete a lithium ion polymer battery.

A method of preparing an anode active material according to one embodiment of the present invention will now be described in more detail.

In one embodiment, a method of preparing an anode active material comprises preparing a mixture by mixing a metal particle powder, a polymer material and a pore-forming material, pulverizing the mixture, and sintering the pulverized mixture. When the mixture is mechanically pulverized, the size of the metal particles in the powder is reduced, the volume changes during charging and discharging are decreased, and the pulverized metal particles, the polymer material and the pore-forming material are adequately mixed. When the pulverized mixture is sintered, the pore-forming material is vaporized to generate empty spaces within the mixture, the polymer material is carbonized to form a conductive carbon-based coating layer, and the metal nano wires grow from the metal particles that contacted the carbon-based coating layer. As a result, an anode active material according to one embodiment of the present invention is obtained.

In one embodiment, the metal particle powder may include a metal that can be alloyed with lithium. Nonlimiting examples of suitable metals for the metal particle powder include Si, Sn, Al, Ge, Pb, Bi, Sb, alloys thereof and mixtures thereof. However, any metal commonly used in lithium batteries can be used.

Nonlimiting examples of suitable polymer materials include resins such as vinyl resins, phenol resins, cellulose resins, pitch resins, tar resins and mixtures thereof. However, any polymer that can be sintered to a carbon-based material by heating can be used as the polymer material.

Nonlimiting examples of suitable pore-forming materials include oxalic acid, citric acid, malic acid, glycine, ammonium carbonate, ammonium bicarbonate, ammonium oxalate and mixtures thereof. However, any material that can be vaporized by heating and that produces pores in the active material can be used.

Nonlimiting examples of suitable pulverizing methods include high energy milling, mechano fusion or using a hammer mill. However, any method that pulverizes the metal particle powder into smaller-sized particles to uniformly mix the polymer material and the metal particle powder can be used.

In one embodiment, sintering of the pulverized mixture is performed at a temperature ranging from about 500 to about 1,400° C. In another embodiment, the sintering is performed at a temperature ranging from about 700 to about 1,000° C. When the sintering temperature is greater than about 1,400° C., the metal core particles melt and the shapes of the metal particles change.

In one embodiment, the polymer material is carbonized at a temperature of about 500° C. When the temperature is lower than about 500° C., the ability to prevent volume changes is too low.

In one embodiment, the weight ratio of the metal particle powder to the polymer material ranges from about 1:50 to about 10:1. In another embodiment, the weight ratio of the metal particle powder to the polymer material ranges from about 1:10 to about 5:1. When the weight ratio is less than about 1:50, the capacity per unit weight of the active material is low. When the weight ratio is greater than about 10:1, the ability of the carbon-based coating layer to prevent the volume change is too low.

In an embodiment of the present invention, the metal particle powder may be silicon, the polymer material may be polyvinyl alcohol, the pore-forming material may be oxalic acid, the pulverizing method may be high energy milling, and the sintering temperature may range from about 700 to about 1,000° C.

Hereinafter, the present invention will be described in more detail with reference to the following examples. These examples are provided for illustrative purposes only and are not intended to limit the scope of the invention.

Preparation of Anode Active Materials

EXAMPLE 1

1 g of silicon metal powder having an average diameter of less than 43 μm, 1 g of polyvinyl alcohol (PVA) powder with a molecular weight of 500, and 3 g of oxalic acid were mixed to form a mixture. The mixture was pulverized by high energy mechanical milling using a SPEX CertiPrep 8000M mill. The pulverized mixture was heated under an argon atmosphere to 800° C. for 10 hours to completely carbonize the PVA. Then, the carbonized product was pulverized in a mortar to prepare an anode active material.

COMPARATIVE EXAMPLE 1

1 g of silicon metal powder having an average diameter of 43 μm was used as an anode active material.

COMPARATIVE EXAMPLE 2

1 g of silicon metal powder having an average diameter of 43 μm and 1 g of polyvinyl alcohol (PVA) powder with a molecular weight of 500 were added to 10 ml of distilled water and stirred until the PVA was completely dissolved. Then, the mixture was gradually heated while stirring until the water was completely evaporated to thereby obtain a solid containing a mixture composed of the above two components. The solid was heated under an argon atmosphere to 800° C. for 10 hours to completely carbonize the PVA. Then, the carbonized product was pulverized in a mortar to prepare an anode active material.

Manufacture of Anode Electrodes

EXAMPLE 2

1 g of the anode active material powder prepared in Example 1, 8.6 g of graphite powder with an average diameter of 10 μm, 2 g of 10 wt % styrene butadiene rubber (SBR), and 0.2 g of carboxymethyl cellulose (CMC) were mixed, and 20 mL of distilled water was added to the mixture. Then, the reaction mixture was stirred for 30 minutes using a mechanical stirrer to prepare a slurry.

The slurry was coated to a thickness of about 200 μm on a copper (Cu) current collector with a doctor blade and then dried. The resultant structure was again dried in a vacuum at 110° C. to manufacture an anode plate.

COMPARATIVE EXAMPLE 3

An anode electrode was manufactured as in Example 2, except that 1 g of the silicon metal powder prepared in Comparative Example 1 was used instead of the active material powder prepared in Example 1.

COMPARATIVE EXAMPLE 4

An anode electrode was manufactured as in Example 2, except that 1 g of the anode active material prepared in Comparative Example 2 was used instead of the anode active material powder prepared in Example 1.
Manufacture of Lithium Batteries

EXAMPLE 3

A 2015 standard coin cell was manufactured using the anode plate manufactured in Example 2, a counter electrode made of lithium metal, a PTFE separator, and an electrolyte solution including 1M $LiPF_6$ dissolved in a mixed solvent of ethylene carbonate (EC) and diethyl carbonate (DEC) in a volume ratio of 3:7.

COMPARATIVE EXAMPLE 5

A lithium battery was manufactured as in Example 3, except that the anode plate prepared in Comparative Example 3 was used.

COMPARATIVE EXAMPLE 6

Figure 3:
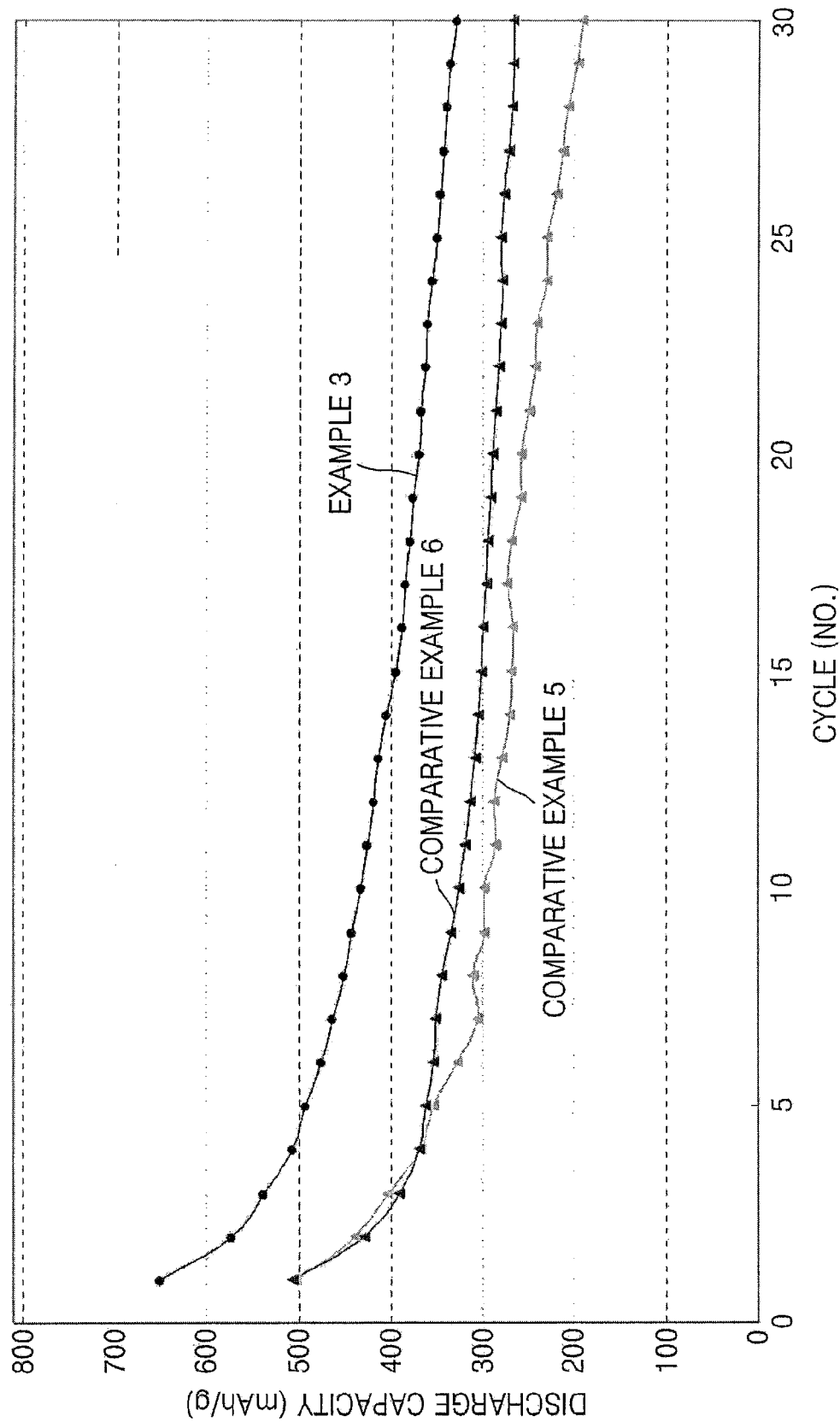
FIG. 3 is a graphical representation of the results of charge/discharge tests performed on the lithium batteries prepared according to Example 3 and Comparative Examples 5 and 6.

A lithium battery was manufactured as in Example 3, except that the anode plate prepared in Comparative Example 4 was used.
Charge/Discharge Experiments The lithium batteries manufactured in Example 3 and Comparative Examples 5 and 6 were charged and discharged at 0.1 C. The results are shown in FIG. 3. Initial charge/discharge capacity and initial charge/discharge efficiency are shown in Table 1.

TABLE 1

|  | Charge capacity (mAh/g) | Discharge capacity (mAh/g) | Initial charge/discharge efficiency (%) |
| --- | --- | --- | --- |
| Example 3 | 802 | 651 | 81 |
| Comparative Example 5 | 750 | 451 | 60 |
| Comparative Example 6 | 680 | 506 | 74 |

As shown in Table 1 and FIG. 3, the initial charge/discharge efficiency was greater than 80% in the lithium battery manufactured in Example 3, but the initial charge/discharge efficiency was less than 75% in the lithium batteries manufactured in Comparative Examples 5 and 6. The capacity retention of the lithium battery manufactured in Example 3 was greater than 50%, which is similar to that of Comparative Example 6, but the capacity retention of the lithium battery manufactured in Comparative Example 5 was less than 40%. Although the capacity retention of the lithium battery manufactured in Example 3 was similar to that of Comparative Example 6, the discharge capacity was 20% higher after 30 cycles in the lithium battery manufactured in Example 3 than in the lithium battery manufactured in Comparative Example 6.

The metal core particles and the metal nano wires being three-dimensionally arranged with pores provides relatively wide surfaces without electrical disconnection. This enables most of the metal active materials to be used reversibly during charging and discharging of the lithium ions, thereby increasing the initial charge/discharge efficiency and the initial charge/discharge capacity, as shown by the results of the test performed on the battery of Example 3.

The pores between the metal core particles and the metal nano wires of the anode active material effectively buffer the volume changes in the metal active materials during charging and discharging, prevent volume changes in the anode active material, prevent cracks in the anode active material, and maintain electrical conductivity. As a result, the lithium battery of Example 3 exhibits enhanced discharge capacity after 30 cycles compared to the lithium batteries of Comparative Examples 5 and 6 (which have capacity retention rates similar to that of the lithium battery in Example 3).

In the anode active material with pores according to the present invention, the metal core particles and metal nano wires formed on the metal core particles are combined into a single body, and a carbon-based coating layer is formed on the surface of the metal nano wires and the metal core particles. Thus, the volume changes in the pulverized metal core particles can be effectively buffered during charging and discharging, and the metal core particles are electrically connected through the metal nano wires. As a result, volume changes in the anode active material can be prevented and degradation of the electrode can be prevented to provide excellent initial charge/discharge efficiency and enhanced charge/discharge capacity.

While certain exemplary embodiments of the present invention have been illustrated and described, it will be understood by those of ordinary skill in the art that various changes and modifications may be made to the described embodiments without departing from the spirit and scope of the present invention as defined by the attached claims.

What is claimed is:

1. A method of preparing an anode active material for a lithium battery, the method comprising:
mixing a metal particle powder, a polymer material and a pore-forming material to prepare a mixture;
pulverizing the mixture; and
sintering the pulverized mixture to prepare an anode active material comprising a carbonized polymer material,
wherein the metal particle powder comprises a metal selected from the group consisting of Si, Sn, Al, Ge, Pb, Bi, Sb, alloys thereof, and combinations thereof as a main component.

2. The method of claim 1, wherein the polymer material comprises a resin selected from the group consisting of vinyl resins, phenol resins, cellulose resins, pitch resins, tar resins and combinations thereof.

3. The method of claim 1, wherein the pore-forming material comprises a compound selected from the group consisting of oxalic acid, citric acid, malic acid, glycine, ammonium carbonate, ammonium bicarbonate, ammonium oxalate and combinations thereof.

4. The method of claim 1, wherein pulverizing the mixture comprises a method selected from the group consisting of high energy milling, mechano fusion and using a hammer mill.

5. The method of claim 1, wherein sintering the pulverized mixture is performed at a temperature ranging from about 500 to about 1,400° C.

6. The method of claim 1, wherein sintering the pulverized mixture is performed at a temperature ranging from about 700 to about 1,000° C.

7. The method of claim 1, wherein the weight ratio of the metal particle powder to the polymer material ranges from about 1:50 to about 10:1.

8. The method of claim 1, wherein the weight ratio of the metal particle powder to the polymer material ranges from about 1:10 to about 5:1.

9. The method of claim 1, wherein the metal particle powder comprises silicon, the polymer material comprises polyvinyl alcohol, the pore-forming material comprises oxalic acid, the pulverizing the mixture comprises high energy milling, and the sintering the pulverized mixture is performed at a temperature ranging from about 700 to about 1,00° C.

10. The method of claim 1, wherein in the sintering the pulverized mixture, metal nano wires grow from the metal particle powder.

\* \* \* \* \*